(12) United States Patent
Worley

(10) Patent No.: US 8,720,907 B2
(45) Date of Patent: May 13, 2014

(54) EXPANSION RING ASSEMBLY

(75) Inventor: Myron S. Worley, Middlebury, IN (US)

(73) Assignee: Press-Seal Gasket Corporation, Fort Wayne, IN (US)

(*) Notice: Subject to any disclaimer, the term of this patent is extended or adjusted under 35 U.S.C. 154(b) by 441 days.

(21) Appl. No.: 13/070,015

(22) Filed: Mar. 23, 2011

(65) Prior Publication Data

US 2012/0007315 A1    Jan. 12, 2012

Related U.S. Application Data

(60) Provisional application No. 61/316,586, filed on Mar. 23, 2010.

(51) Int. Cl.
*F16L 5/10*    (2006.01)

(52) U.S. Cl.
USPC .................. 277/606; 24/279; 24/282; 24/284

(58) Field of Classification Search
USPC ............ 24/279, 282, 284; 277/602, 606, 607, 277/609, 616; 138/97; 285/109, 236, 370
See application file for complete search history.

(56) References Cited

U.S. PATENT DOCUMENTS

| | | | | |
|---|---|---|---|---|
| 519,312 | A | * | 5/1894 | Arthur ............................ 24/282 |
| 664,390 | A | * | 12/1900 | Durham ......................... 24/282 |
| 968,506 | A | | 8/1910 | Blaha |
| 1,368,068 | A | * | 2/1921 | Stein et al. ...................... 24/282 |
| 1,467,708 | A | * | 9/1923 | Cooper ........................... 24/282 |
| 2,162,959 | A | | 6/1939 | Madison |
| 2,479,172 | A | | 8/1949 | Landon |
| 3,474,832 | A | | 10/1969 | Broadhead et al. |
| 3,516,446 | A | | 6/1970 | O'Hargan et al. |
| 3,700,265 | A | | 10/1972 | Dufour et al. |
| 3,840,053 | A | | 10/1974 | Sluga |
| 3,958,313 | A | | 5/1976 | Rossborough |
| 3,960,395 | A | | 6/1976 | Cirule et al. |
| 4,097,171 | A | | 6/1978 | Fier |
| 4,379,693 | A | | 4/1983 | Wallshein |
| 4,391,317 | A | * | 7/1983 | Savage ........................... 24/282 |
| 4,469,467 | A | | 9/1984 | Odill et al. |
| 4,478,437 | A | | 10/1984 | Skinner |
| 4,521,940 | A | * | 6/1985 | Oetiker .......................... 24/282 |
| 4,543,691 | A | | 10/1985 | Calmettes |
| 4,582,450 | A | | 4/1986 | Neil |
| 4,711,455 | A | | 12/1987 | Ditcher et al. |
| 4,746,127 | A | | 5/1988 | Westhoff et al. |

(Continued)

*Primary Examiner* — Robert J Sandy
(74) *Attorney, Agent, or Firm* — Faegre Baker Daniels LLP

(57) ABSTRACT

An expansion ring assembly seals a gasket with respect to an annular wall of a rigid structure. The expansion ring assembly includes two arcuate expansion ring bands that cooperate to define a generally circular profile. At one side of the expansion ring assembly, a first pair of ends of the expansion ring bands overlap and include a ratcheting mechanism which allows the ring to incrementally expand but not to contract. At another location of the expansion ring assembly, a second pair of ends are joined by a drive mechanism for engaging and driving apart the opposing ends of an expansion ring to thereby non-incrementally expand the ring. The ratchet mechanism may be used to initially set and hold the expansion ring against a gasket in a desired position and to provide an initial expansion pressure, i.e., for a coarse adjustment. The drive mechanism may then be used to provide a final expansion pressure of the gasket, i.e., for a fine adjustment. Advantageously, the coarse adjustment followed by the final adjustment allows a user to quickly and precisely achieve a desired gasket pressure by manipulating the torque applied to the drive mechanism.

16 Claims, 10 Drawing Sheets

(56) References Cited

U.S. PATENT DOCUMENTS

| | | |
|---|---|---|
| 4,867,601 A | 9/1989 | Bowman |
| 4,872,780 A | 10/1989 | Bowman |
| 4,890,863 A | 1/1990 | Westhoff et al. |
| 4,903,970 A | 2/1990 | Ditcher et al. |
| 4,910,832 A | 3/1990 | Schaub et al. |
| 4,927,189 A | 5/1990 | Burkit |
| 4,927,290 A | 5/1990 | Bowman |
| 5,029,907 A | 7/1991 | Gundy |
| RE33,744 E | 11/1991 | Oetiker |
| 5,076,618 A | 12/1991 | Bridges |
| 5,086,809 A | 2/1992 | Bridges |
| 5,150,927 A | 9/1992 | Skinner |
| 5,170,540 A | 12/1992 | Oetiker |
| 5,209,601 A | 5/1993 | Odill et al. |
| RE34,550 E | 2/1994 | Bowman |
| 5,316,407 A | 5/1994 | Miller |
| 5,333,360 A | 8/1994 | Oetiker |
| 5,423,630 A | 6/1995 | Imoto et al. |
| 5,465,758 A | 11/1995 | Graf et al. |
| 5,474,396 A | 12/1995 | Bravo |
| 5,496,128 A | 3/1996 | Odill |
| 5,507,500 A | 4/1996 | Skinner et al. |
| 5,570,890 A | 11/1996 | Skinner et al. |
| 5,597,263 A | 1/1997 | Bravo |
| 5,732,955 A | 3/1998 | Skinner et al. |
| 5,738,359 A | 4/1998 | Gundy |
| 5,743,673 A | 4/1998 | Bravo |
| 5,769,459 A | 6/1998 | Graf et al. |
| 5,899,024 A | 5/1999 | Stannard |
| 5,904,442 A * | 5/1999 | Takeda .................. 24/282 |
| 5,954,344 A | 9/1999 | Miller |
| 6,126,206 A | 10/2000 | Topf, Jr. |
| 6,435,566 B1 | 8/2002 | Topf, Jr. |
| 6,473,943 B1 | 11/2002 | Thacker |
| 6,607,219 B2 | 8/2003 | Mirales et al. |
| 6,685,229 B2 | 2/2004 | Morrison |
| 6,805,359 B2 | 10/2004 | Neuhaus et al. |
| 6,866,301 B2 | 3/2005 | Brockway |
| 6,953,194 B2 | 10/2005 | Brockway |
| 6,955,498 B1 | 10/2005 | McCuan et al. |
| 7,146,689 B2 | 12/2006 | Neuhaus et al. |
| 7,243,956 B2 | 7/2007 | Brockway |
| 7,263,746 B2 | 9/2007 | Neuhaus et al. |
| 7,302,741 B2 | 12/2007 | Bowater |
| 7,350,827 B2 | 4/2008 | Zeigler |
| 7,603,752 B2 | 10/2009 | Heath et al. |
| 2005/0006853 A1 * | 1/2005 | Neuhaus et al. ............. 277/576 |

* cited by examiner

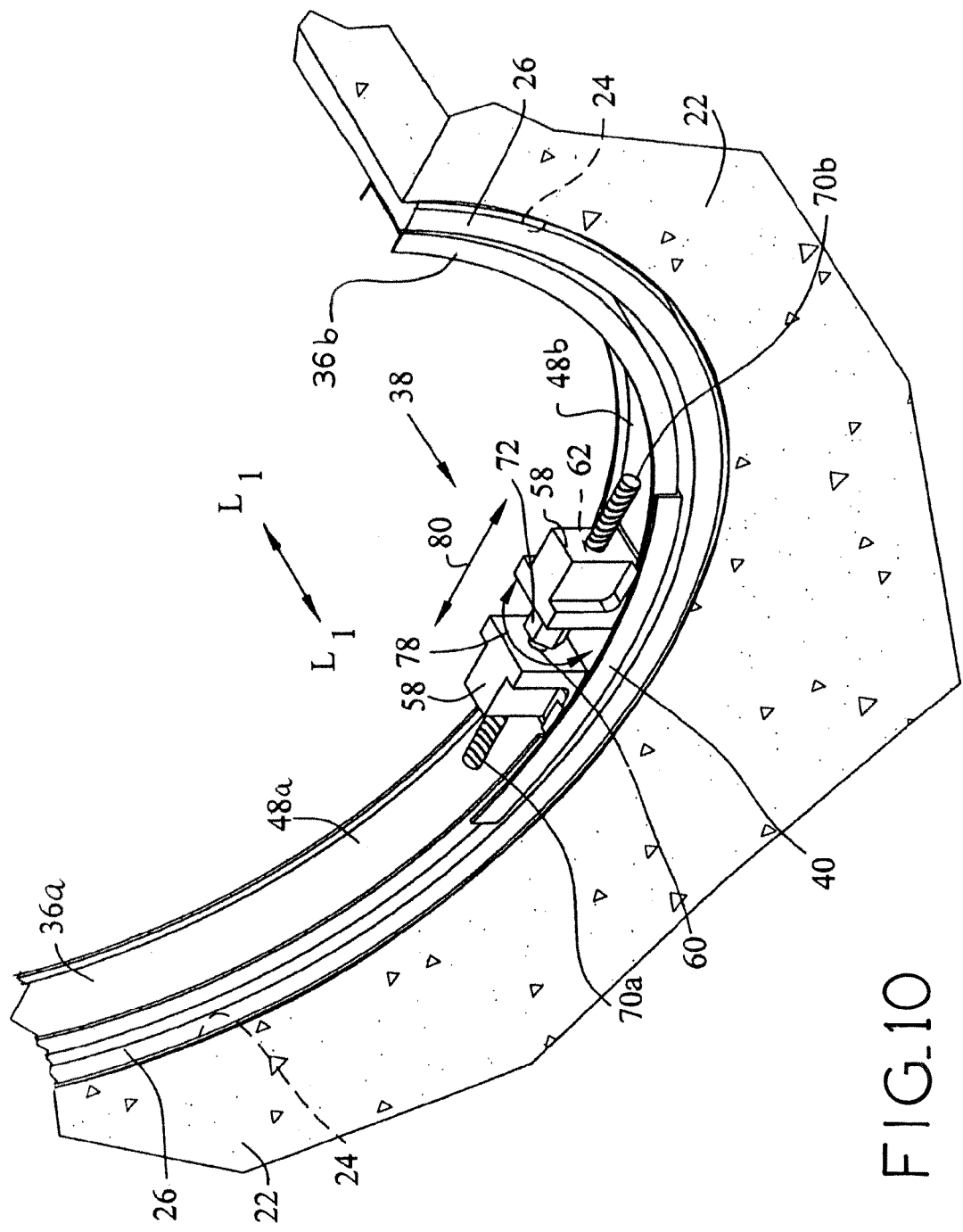
FIG_10

EXPANSION RING ASSEMBLY

CROSS-REFERENCE TO RELATED APPLICATION

This application claims priority under Title 35, U.S.C. §119(e) to U.S. Provisional Patent Application Ser. No. 61/316,586, filed Mar. 23, 2010, the entire disclosure of which is hereby expressly incorporated by reference herein.

BACKGROUND OF THE INVENTION

1. Technical Field

The present disclosure relates to an expandable seal arrangement, and associated method, for sealing a gasket to an annular wall of a rigid structure.

2. Description of the Related Art

Manhole access ports are often assemblies of various components placed adjacent one another, and have joints which may also need to be sealed from leakage. For example, it may be desirable to provide a seal across a manhole frame, optionally one or more grade rings, and a manhole chimney to prevent moisture infiltration into the fluid passageway accessed by the manhole access port.

In underground pipe systems, it is often necessary to connect a pipe in a sealed manner within an opening in the wall of a rigid structure, such as a manhole riser or monolithic base, for example. Typically, a flexible elastomeric gasket is placed within the opening in the wall, followed by fitting an expansion ring against the interior surface of the gasket. Thereafter, a suitable expansion mechanism is used to radially expand the expansion ring and lock same in an expanded condition in which the gasket is sealingly compressed between the expansion ring and the opening in the wall of the structure. Thereafter, a pipe is inserted through the gasket, and one or more clamps are installed around a portion of the gasket which extends from the wall to sealingly compress the extending portion of the gasket between the clamps and the outer surface of the pipe. In this manner, a sealed connection is made between the pipe and the structure.

Similarly, sealed connections between two pipes are frequently made. Underground pipes which are used in municipal water and sewer systems, for example, typically include bell and spigot ends that are attached to one another in a sealed manner. Typically, either the spigot end or the bell end of such pipes includes a rubber seal which is compressed between the ends of the pipes to provide a sealed joint when the spigot end of one pipe is inserted into the bell end of another pipe. Occasionally, these primary joint seals between adjacent pipes may leak after installation in the field, requiring a secondary sealing assembly to seal the connection.

Yet another application for a pipe seal is the fixing of a leak within a pipe structure. Where a pipe has begun allowing ingress of moisture, such as through a hole or crack in the wall of the pipe, a gasket may be placed within the wall of the pipe spanning the structure, and each side of the gasket may be sealed to prevent further leakage into the pipe.

To make the above seals, a flexible elastomeric gasket may be placed against the pipe or manhole wall, followed by fitting an expansion ring against the interior surface of the gasket. Thereafter, a suitable expansion mechanism is used to radially expand the expansion ring and lock same in an expanded condition so that the gasket is sealingly compressed between the expansion ring and the wall of the pipe or manhole at the joint. Thereafter, a pipe is inserted through the gasket, and one or more clamps are installed around a portion of the gasket which extends from the wall to sealingly compress the extending portion of the gasket between the clamps and the outer surface of the pipe. In this manner, a sealed connection is made between the pipe and the structure.

What is needed is an improved expansion ring mechanism and sealing assembly for sealing joints in fluid-carrying structures such as manhole access ports, underground pipes, and underground pipe junction points, for example.

SUMMARY

The present disclosure provides an expansion ring assembly for sealing a gasket with respect to an annular wall of a rigid structure. The expansion ring assembly includes two arcuate expansion ring bands that cooperate to define a generally circular profile. At one side of the expansion ring assembly, a first pair of ends of the expansion ring bands overlap and include a ratcheting mechanism which allows the ring to incrementally expand but not to contract. At another location of the expansion ring assembly, a second pair of ends are joined by a drive mechanism for engaging and driving apart the opposing ends of an expansion ring to thereby non-incrementally expand the ring. The ratchet mechanism may be used to initially set and hold the expansion ring against a gasket in a desired position and to provide an initial expansion pressure, i.e., for a coarse adjustment. The drive mechanism may then be used to provide a final expansion pressure of the gasket, i.e., for a fine adjustment. Advantageously, the coarse adjustment followed by the final adjustment allows a user to quickly and precisely achieve a desired gasket pressure by manipulating the torque applied to the drive mechanism.

The ratchet mechanism includes a tooth formed on the first ring band which cooperates with a series or rack of slots or apertures formed in the second, overlapping ring band, each of the apertures sized to receive the tooth therein. As the first and second ring bands are moved apart from one another to incrementally expand the overall size of the expansion ring, the tooth advances along the series of slots. Movement of the tooth in the other direction is prevented by the ratchet mechanism, so that contraction of the band is prevented from occurring once the band has been expanded.

The drive mechanism generally includes a pair of block members having threaded bores therethrough, and a bolt having oppositely-threaded ends which are threaded within respective bores of the block members. The bolt additionally includes a tool-receiving structure, such as a nut portion, which may be engaged by a suitable tool to rotate the bolt. The block members are respectively engaged with opposite ends of the expansion ring. Rotation of the bolt in a first direction simultaneously drives the block members apart from one another along the bolt to radially expand the expansion ring, and rotation of the bolt in a an opposite, second direction simultaneously drives the block members toward one another along the bolt to allow the expansion ring to radially contract.

Expansion of the expansion ring compresses the gasket between the expansion ring and the opening of the structure to provide a fluid tight seal between the gasket and the structure. Subsequently, a gasket may be sealed about the interface between a manhole base and a manhole frame to prevent water infiltration into a manhole.

The present expansion ring assembly may also be used in other applications, such as, for example, for sealing an internal coupling gasket within one or more pipes to prevent water infiltration into a pipeline. Alternatively, a pipe may be coupled to a structure by coupling a gasket to an annular opening in the wall of a structure and inserting a pipe through a second portion of the gasket which extends outwardly of the structure, and then securing the extending portion of the gasket to the outer surface of the pipe using conventional hose clamps or take-up clamps, for example.

Advantageously, the ratchet mechanism allows rapid expansion of a contracted expansion ring to a size nearly large enough to form a fluid-tight seal. An initial expansion is rapidly accomplished utilizing the ratchet mechanism. The substantial overlap of the expansion ring bands at the ratchet mechanism allow a large expansion from a contracted state, so that the expansion ring assembly may easily be placed within a manhole or pipe assembly prior to expansion. The ratcheting mechanism is then used to expand the expansion ring assembly to fit the annular surface of the manhole or pipe, with overlap remaining at the ratcheting mechanism to provide a continuous annular surface for an effective gasket seal.

For the final expansion of the expansion ring, the oppositely-threaded ends of the bolt may be rotated in one direction to simultaneously drive the block members apart from each other to expand the expansion ring, such that only one tool need be used to actuate the drive mechanism to expand the expansion ring. Additionally, the screw threaded engagement between the bolt and the block members allows the block members to be driven away from one another along the bolt to an infinitely variable extent based upon the rotational position of the bolt. Therefore, after the initial rapid expansion of the ring with the ratchet mechanism, the expansion ring may be further expanded by applying a known amount of torque to the drive mechanism. A precise pressure in the expansion ring assembly is achieved, and the gasket is firmly and sufficiently compressed between the expansion ring and the opening of the structure to provide a fluid tight seal.

A further advantage of the expansion ring assembly is the ability to remove the assembly from the structure if needed, followed by re-installing the assembly in a different position, or by re-using the assembly by installing same in a different structure or using same in a different application. The expansion ring may be collapsed to a contracted position by rotating the bolt of the drive mechanism in the opposite direction, and/or by disengaging the ratcheting mechanism.

The disclosure, in one form thereof, comprises an expansion ring assembly for sealing a gasket against an annular surface, the expansion ring assembly, including a ring having a circumference, the ring including first and second ring band each having opposite ends, a ratcheting mechanism joining respective first ends of the ring band, the ratcheting mechanism allowing incremental expansion of the circumference of the ring by a first distance and preventing contraction of the circumference of the ring, and a drive mechanism joining respective second ends of the ring band, the drive mechanism including a pair of first threaded members joined to the respective second ends of the ring band, and a second threaded member disposed between and threadingly connecting the pair of first threaded members, the drive mechanism allowing non-incremental expansion of the circumference of the ring by a second distance to a fully expanded configuration, the drive mechanism also allowing non-incremental contraction of the circumference of the ring by a third distance, whereby the expansion ring assembly cooperates with the gasket to form a fluid type seal at the annular surface and a fully expanded configuration.

The disclosure, in another form thereof, comprises an expansion ring assembly for sealing the gasket against an annular surface, the expansion ring assembly comprising a ring having a circumference, the ring including first and second ring bands each having opposite ends, means for providing incremental expansion of the circumference of the rings by a first distance, the means for providing incremental expansion preventing contraction of the circumference of the ring, and means for providing non-incremental expansion of the circumference of the ring by a second distance to a fully expanded configuration, the means for providing non-incremental expansion also allowing non-incremental contraction of the circumference of the ring by a third distance, whereby the expansion ring assembly cooperates with the gasket to form a fluid type seal at the annular surface and the fully expanded configuration.

The disclosure, in a further form thereof, comprises a method of installing a gasket against annular surface, the method including placing an expansion ring assembly in a contracted configuration approximate to gasket so that gasket is disposed between the expansion ring assembly and the annular surface, actuating a first, ratcheting mechanism to incrementally expand the expansion ring assembly to a partially expanded configuration, and actuating a second mechanism having a pair of threaded members, where an actuation of the second mechanism simultaneously drives the pair of threaded members away from one another to non-incrementally expand the expansion ring assembly to a fully expanded configuration, the expansion ring assembly cooperating with the gasket to form a fluid type seal at the annular surface in the fully expanded configuration.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 10 is a fragmentary perspective view of the pipe connection of FIG. 1A, showing the actuation of the drive mechanism to expand the expansion ring.

Corresponding reference characters indicate corresponding parts throughout the several views. The exemplifications set out herein illustrate embodiments of the disclosure, and such exemplifications are not to be construed as limiting the scope of the invention any manner.

DETAILED DESCRIPTION

Figure 1:
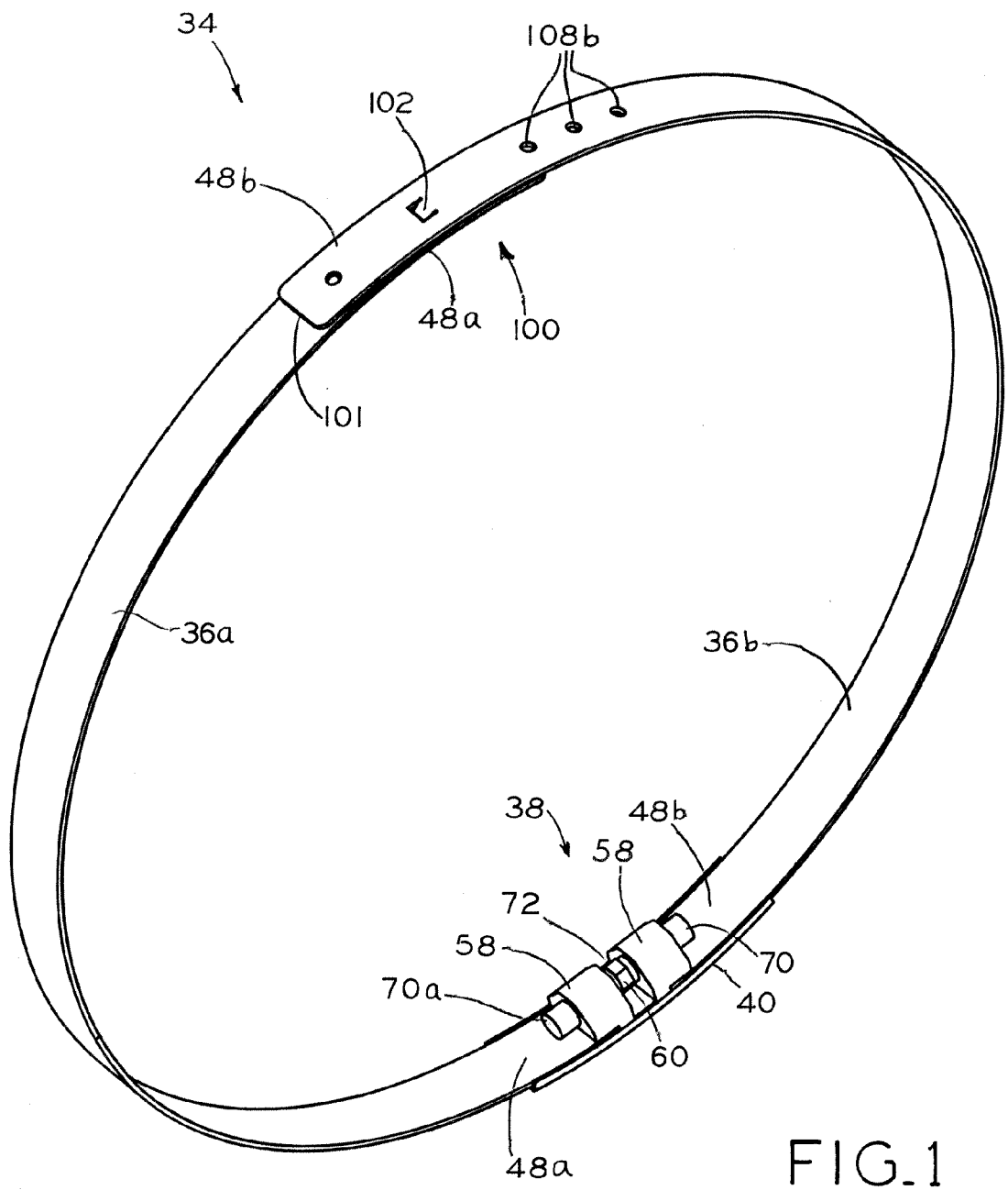
FIG. 1 is a perspective view of an expansion ring assembly in accordance with the present disclosure.
Figure 2:
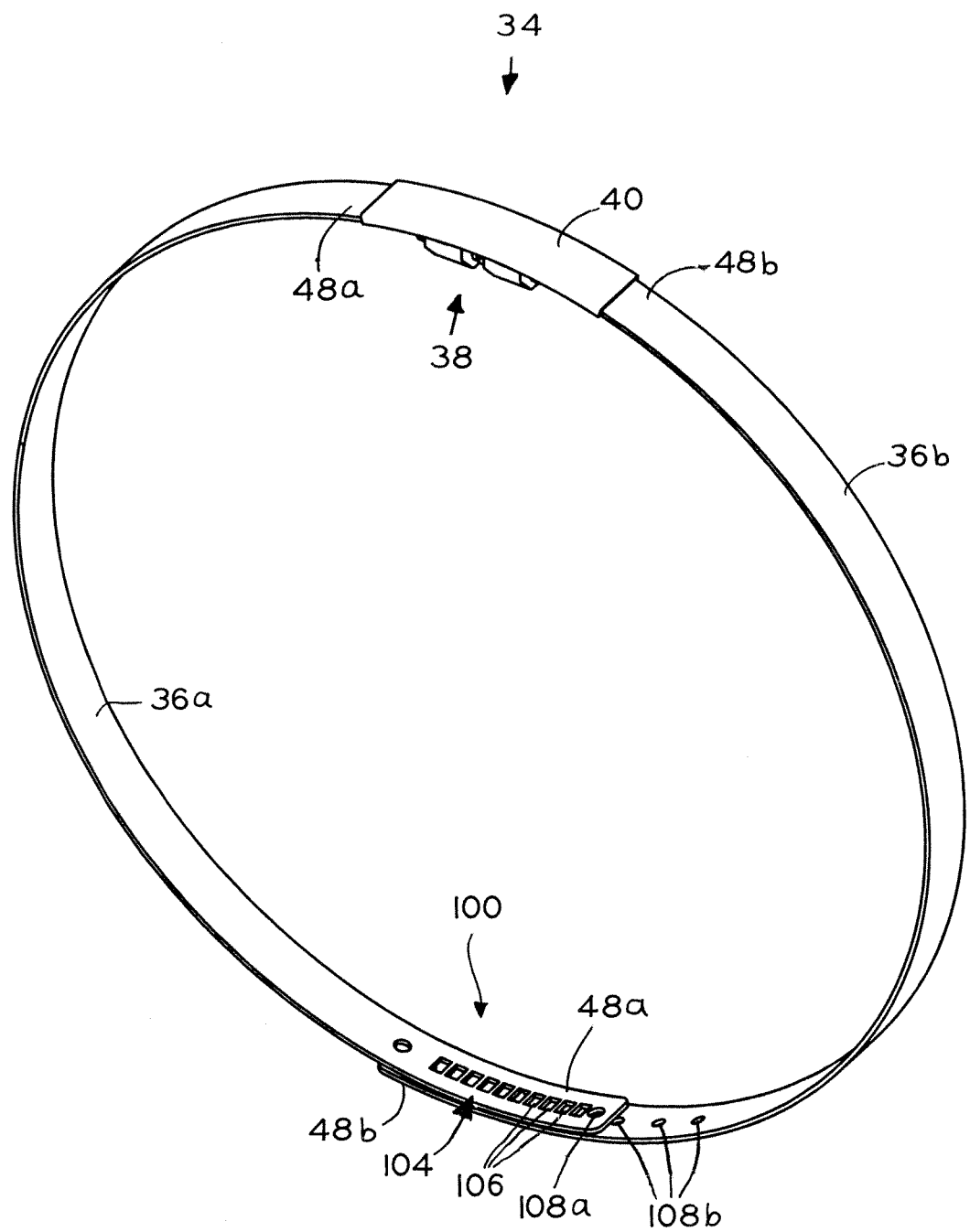
FIG. 2 is another perspective view of the expansion ring assembly shown in FIG. 1.

Referring to FIGS. 1 and 2, expansion ring assembly 34 includes first ring band 36a having opposite ends 48a, and second ring band 36b having opposite ends 48b. At one side of expansion ring mechanism 34, ends 48a, 48b of ring bands 36a, 36b are joined by drive mechanism 38, which can be used to continuously non-incrementally expand or non-incrementally contract the overall size of expansion ring assembly 34 as discussed in detail below. At the other end of expansion ring assembly 34, ends 48a, 48b of ring bands 36a, 36b are joined by ratchet mechanism 100, which can be used to quickly incrementally expand expansion ring assembly 34 by discrete amounts. Ratchet mechanism 100 can be used to make a "macro" or large-scale expansion of expansion ring assembly 34, such as upon initial installation at a manhole assembly, pipe connection, or the like. With this large scale adjustment made, drive mechanism 38 may be used to make "micro" or small-scale adjustments to either expand or contract expansion ring assembly 34 to provide a desired or appropriate amount of expansion force or pressure, such as may be required for a particular gasket arrangement. The expansion force may be inferred from the amount of torque applied to drive mechanism, so that a known torque indicates the desired amount of expansion pressure.

FIG. 2 illustrates ratchet mechanism 100 joining ends 48a, 48b of ring bands 36a, 36b. Ratchet mechanism 100 allows first ring band 36a to move relative to second ring band 36b in direction A. Direction A corresponds to the direction of a first distance along which ratchet mechanism 100 allows incremental expansion of the circumference of ring assembly 34. FIG. 2 also illustrates drive mechanism 38 joining opposite ends 48a, 48b of ring bands 36a, 36b. Drive mechanism 38 allows first ring band 36a to move in direction $B_1$ and second ring band 36b to move in direction $B_2$ such that first ring band 36a and second ring band 36b simultaneously move away from one another. Direction $B_1$ and direction $B_2$ correspond to the direction of a second distance along which drive mechanism 38 allows non-incremental expansion of the circumference of ring assembly 34 to a fully expanded configuration. Drive mechanism 38 also allows first ring band 36a to move in direction $C_1$ and second ring band 36b to move in direction $C_2$ such that first ring band 36a and second ring band 36b simultaneously move toward one another. Direction $C_1$ and direction $C_2$ correspond to the direction of a third distance along which drive mechanism 38 allows non-incremental contraction of the circumference of ring assembly 34. In one embodiment, the first distance that ratchet mechanism 100 allows incremental expansion of the circumference of ring assembly 34 is greater than the second distance that drive mechanism 38 allows non-incremental expansion of the circumference of ring assembly 34.

1. Expansion Ring Assembly Uses and Environments

In use, expansion ring assembly 34 may be used to seal a gasket at a connection or junction between two or more fluid-carrying structures. For example, referring to FIG. 6, expansion ring assembly may be used to seal gasket 26 at pipe connection 20. Pipe connection 20 is shown in the context of an underground pipe system, in which a pipe is connected to a structure, such as a manhole riser or monolithic base, for example. The structure may be formed of concrete, fiberglass, or any other suitable rigid material. The structure includes wall 22 having interior side 22a defining the interior of the structure, and exterior side 22b defining the exterior of the structure. Additionally, wall 22 includes opening 24 therein. An annular gasket 26 includes a first portion 28 disposed within opening 24 of wall 22, and a second portion 30 extending from first portion 28. Gasket 26 may be made from a flexible, elastomeric material such as rubber or neoprene, for example, and provides a sealing connection between opening 24 in wall 22 of the structure and a pipe 32. First portion 28 of gasket 26 is sealingly engaged with opening 24 of wall 22 by expansion ring assembly 34, which generally includes first and second expansion ring bands 36a, 36b, drive mechanism 38, oversleeve 40, and ratchet mechanism 100. As discussed in detail below, expansion ring assembly 34 is radially expandable to compress gasket 26 into sealing engagement with opening 24 in wall 22 to provide a fluid tight seal therebetween.

After first portion 28 of gasket 26 is sealingly engaged with opening 24 of wall 22 by expansion ring assembly 34, second portion 30 of gasket 26 is connected to pipe 32 by inserting pipe 32 therethrough, followed by installing one or more clamps 42 around second portion 30 of gasket 26 and tightening clamps 42 to compress second portion 28 of gasket 26 into sealing engagement with outer surface 44 of pipe 32 to provide a fluid tight seal therebetween. Second portion 30 of gasket 26 may include annular recessed seats 46 for receipt of clamps 42 to locate clamps 42 on second portion 30 of gasket 26.

Figure 6:
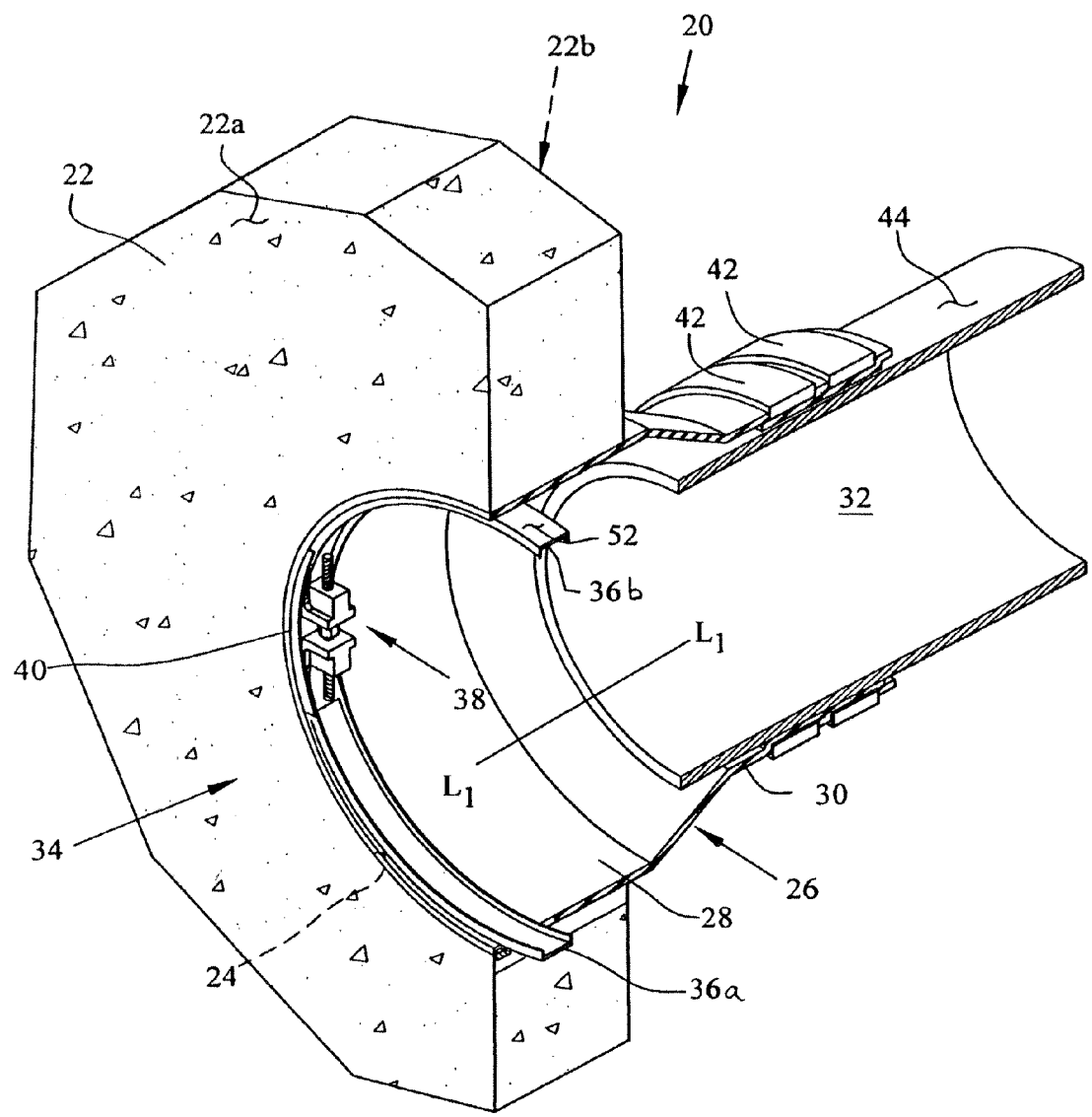
FIG. 6 is a partial sectional view of a connection between a concrete structure and a pipe, wherein a wall of the concrete structure includes an opening into which a gasket is sealingly fitted with an expansion ring assembly according to the present disclosure, and further showing a pipe sealingly connected to the gasket.

In FIG. 6, only a portion of the length of pipe 32 is shown for clarity, it being understood that pipe 32 typically extends past expansion ring assembly 34 through opening 24 in wall 22, past inner surface 22a of wall 22, and into the interior of the structure. Also, expansion ring assembly 34 is shown in FIG. 6 with drive mechanism 38 disposed in a nine o'clock position with respect to opening 24 for clarity, and with ratcheting mechanism 100 not shown, it being understood that ratcheting mechanism 100 is disposed generally opposite drive mechanism 38. However, expansion ring assembly 34 may be selectively configured with drive mechanism 38 and ratcheting mechanism 100 oriented in any desired position around the circumference of opening 24, it being noted that a configuration with drive mechanism 38 disposed in a twelve o'clock position is favored in many applications. Further, the pipe connection of FIG. 6 may installed in a manner in which second portion 30 of gasket 26 extends inward of wall 22, in essentially the opposite manner shown in FIG. 6, such that clamps 42 are disposed within the structure.

Figure 7:
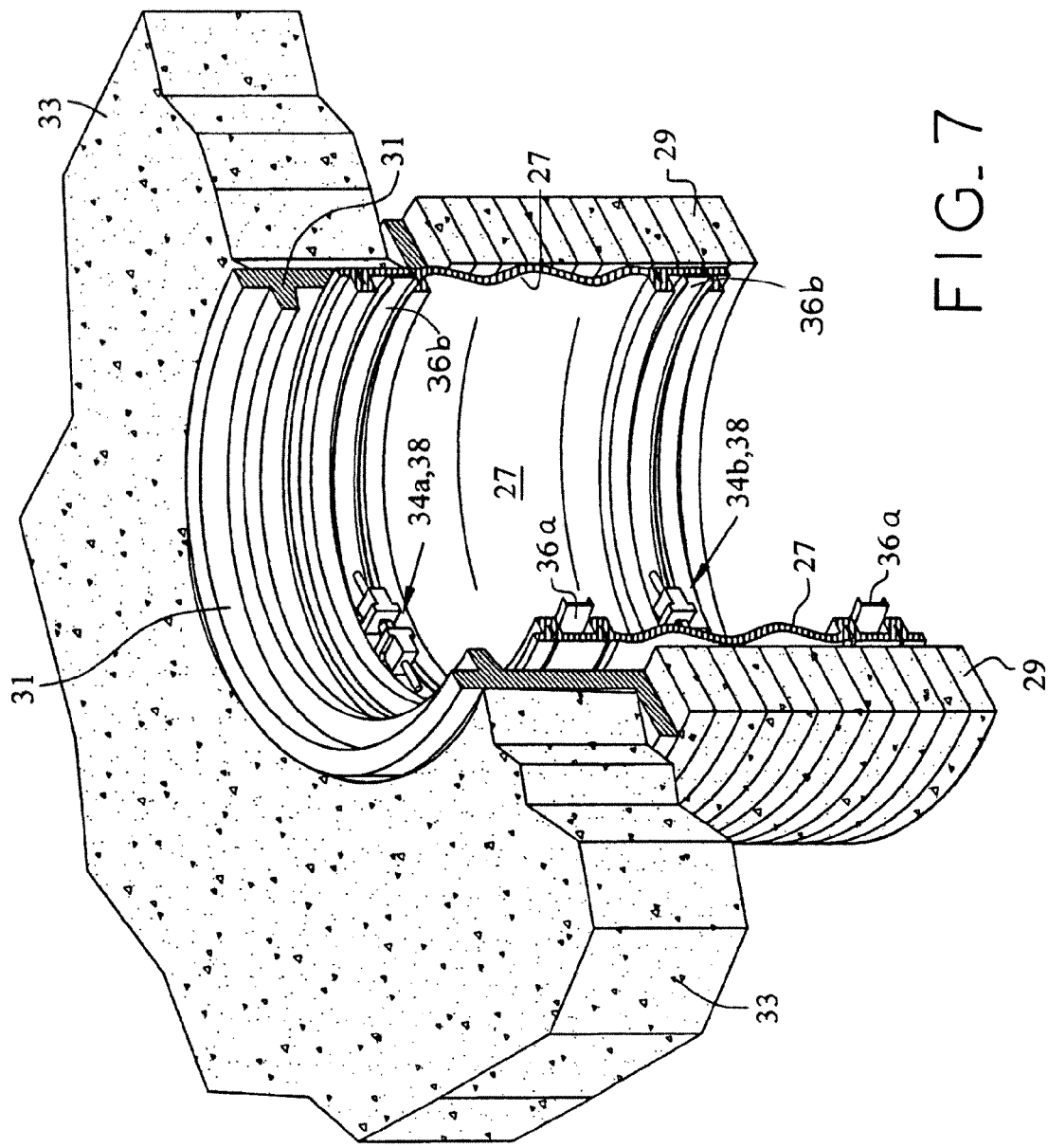
FIG. 7 is a partial sectional view of a connection between a manhole frame and a manhole base disposed beneath a pavement surface, showing a gasket sealingly connecting the manhole base and the manhole frame using a pair of expansion ring assemblies according to the present disclosure to prevent water infiltration into the manhole.

Although expansion ring assembly 34 is shown in FIG. 6 in an application in which expansion ring assembly 34 is used to seal a gasket within an opening in the wall of a structure, expansion ring assembly 34 may also be used in many other applications. For example, in FIG. 7, a pair of expansion ring assemblies 34a and 34b are used to seal gasket 27 about an interface between manhole base 29 and a manhole frame 31 disposed beneath pavement surface 33. Specifically, an upper expansion ring assembly 34a is used to press an upper portion of gasket 27 into sealing engagement with manhole frame 31, and a lower expansion ring assembly 34b is used to press a lower portion of gasket 27 into sealing engagement with manhole base 29. In this manner, water infiltration into manhole base 29 is prevented, regardless of whether relative movement occurs between manhole frame 31 and manhole base 29.

Figure 8:
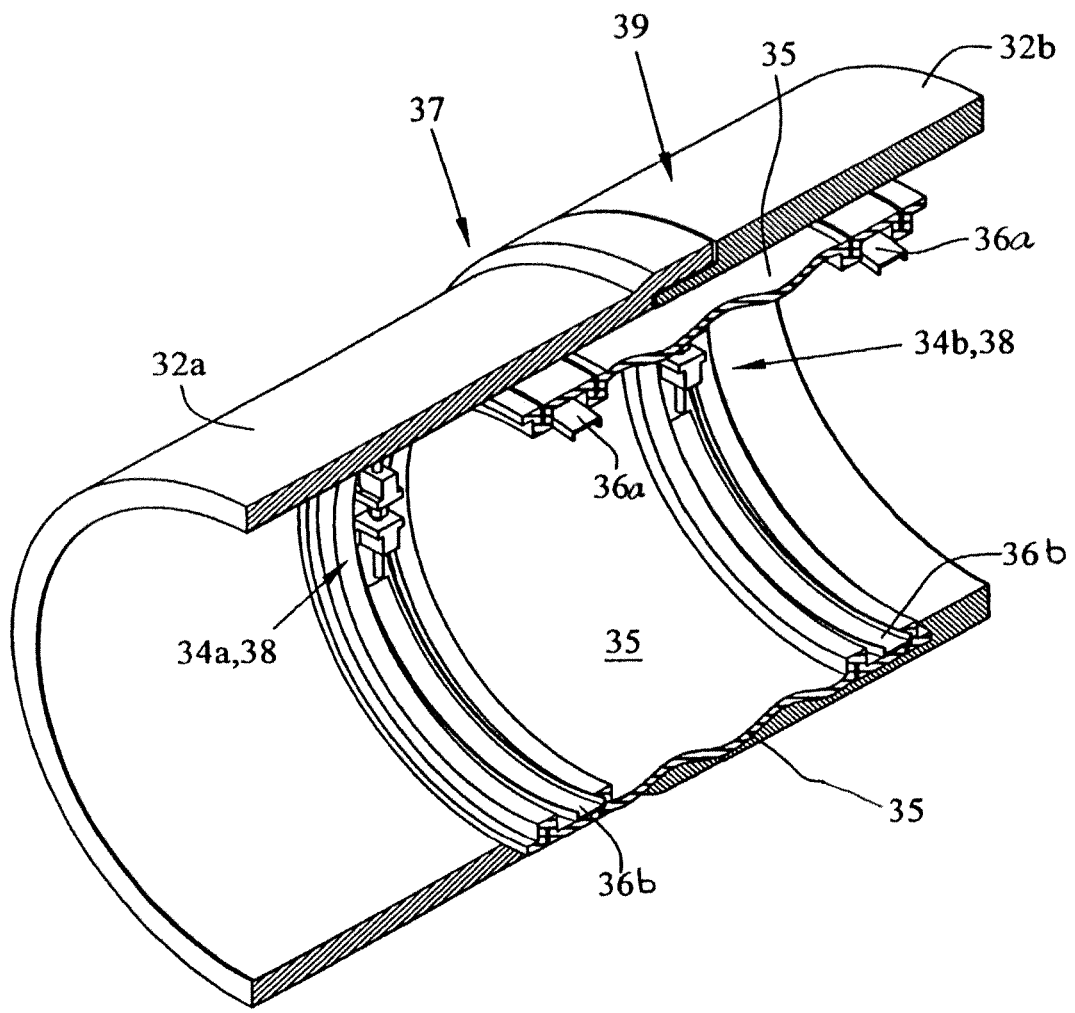
FIG. 8 is a partially exploded view of a pipe-to-pipe connection which includes an internal pipe coupler therebetween, the internal pipe coupler including a pair of expansion ring assemblies according to the present disclosure to prevent water infiltration into the pipes.

In FIG. 8, a pair of expansion ring assemblies 34a and 34b are used with an internal coupling gasket 35 for sealing a connection between the female or bell end 37 of a first pipe 32a and the male or spigot end 39 of a second pipe 32b. Specifically, a first expansion ring mechanism 34a presses one end of gasket 35 into sealing engagement with bell end 37 of pipe 32a, and a second expansion ring assembly presses an opposite end of gasket 35 into sealing engagement with spigot end 39 of pipe 32b to prevent water infiltration into the pipes if or when the primary bell-spigot connection between pipes 32a and 32b fails. Alternatively, expansion ring assemblies 34a and 34b may be used with an internal coupling gasket 35 to bridge and seal a crack or leak disposed anywhere along a single pipe 32 within a pipeline.

Thus, expansion ring assembly 34 may be used in any application which generally involves the radial expansion of a flexible gasket into sealing engagement with a rigid structure. The details and operation of expansion ring assembly 34 are discussed below.

2. Expansion Ring Construction

Figure 9:
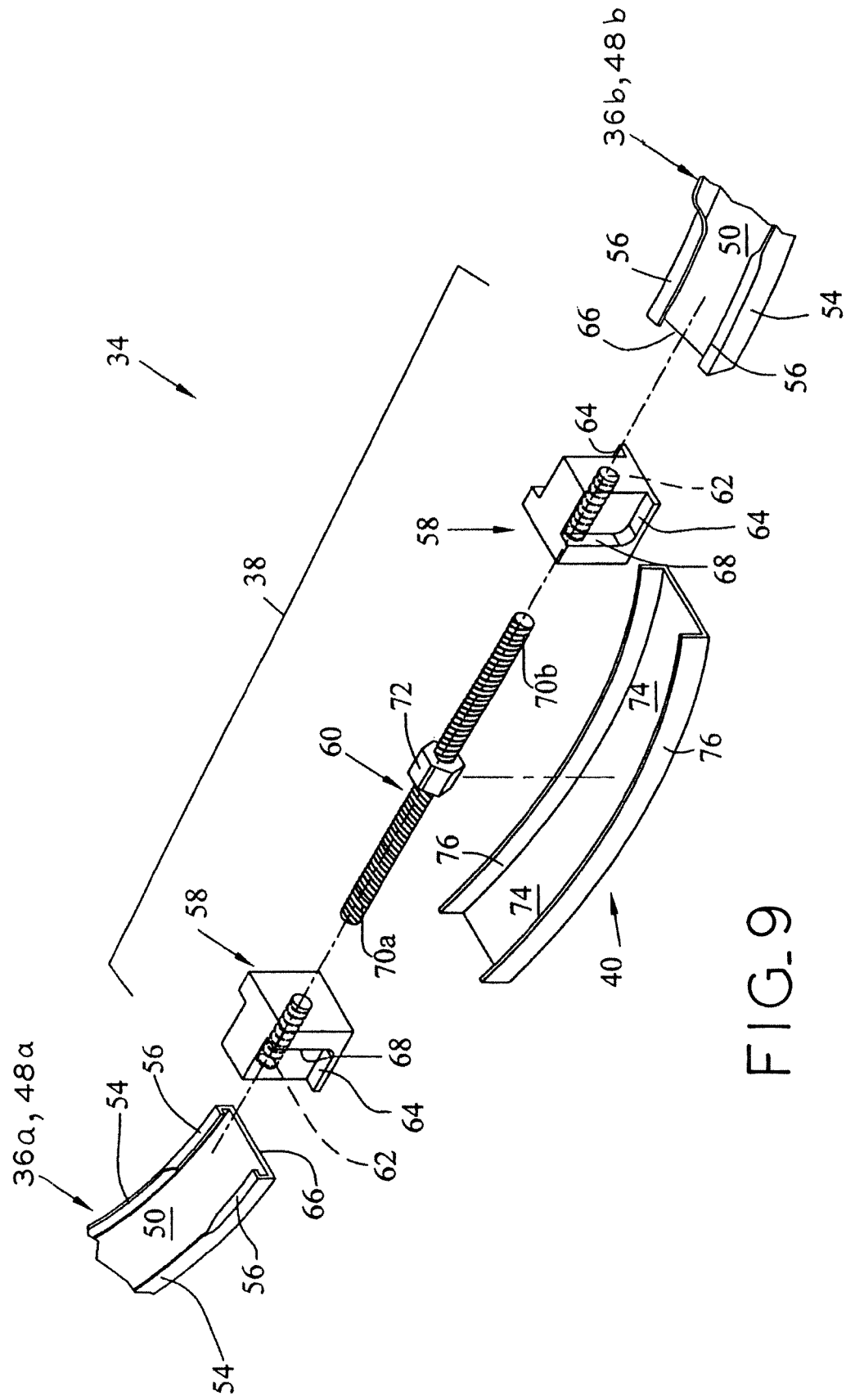
FIG. 9 is an exploded, fragmentary view of the expansion ring assembly of FIG. 1A, showing the expansion ring ends, the drive mechanism, and the oversleeve.

Referring to FIGS. 1, 2 and 9, a first embodiment of expansion ring assembly 34 is shown. Expansion ring bands 36a, 36b are made of a continuous strip of material, such as stainless steel, other metals, or a plastic, for example, and include opposite ends 48a, 48b, respectively. Expansion ring bands 36a, 36b may include a generally planar base wall 50 (FIG. 9) having outer surface 52 for engaging the interior surface of a gasket. Expansion ring bands 36a, 36b may form substantially flat annular surfaces, as shown in FIGS. 1-4, 6, 7 and 10, or may have side walls 54 projecting inwardly from base wall 50, as shown in FIG. 9. Where bands 36a, 36b have side walls, 54, base wall 50 and side walls 54 together define a generally U-shaped cross-sectional profile; however, the overall shape of expansion ring bands 36a, 36b may vary. As shown in FIG. 9, ends 48a, 48b of expansion ring bands 36a, 36b may also include optional crimped portions 56. Side walls 54 and/or crimped portions 56 may be provided at either end of bands 36a, 36b, i.e., side walls 54 and crimped portions 56 may cooperate with either drive mechanism 38 or ratchet mechanism 100, or both.

In the illustrated embodiment, expansion ring bands 36a, 36b each span about half of the overall circumferential extent of expansion ring assembly 34. However, it is within the scope of the present disclosure that expansion ring bands 36a, 36b may not be equal in length. In addition, more than two expansion ring bands may be used to form expansion ring assembly 34, with drive mechanism 38 and/or ratchet mechanism 100 disposed at the junction between each respective ring band.

Figure 3:
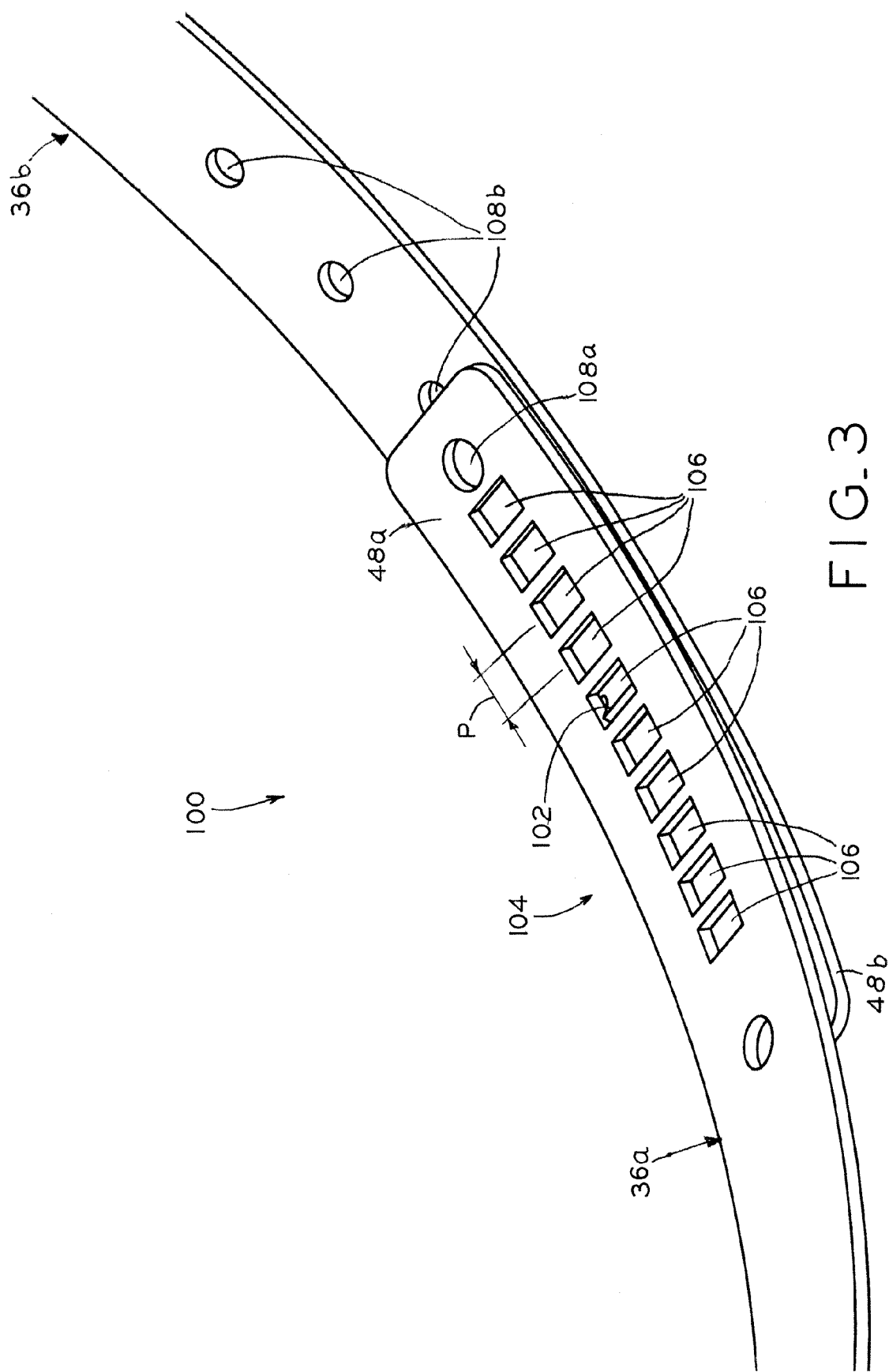
FIG. 3 is a partial perspective view of a portion of the expansion ring assembly shown in FIG. 2, illustrating a ratcheting mechanism series of slots.
Figure 4:
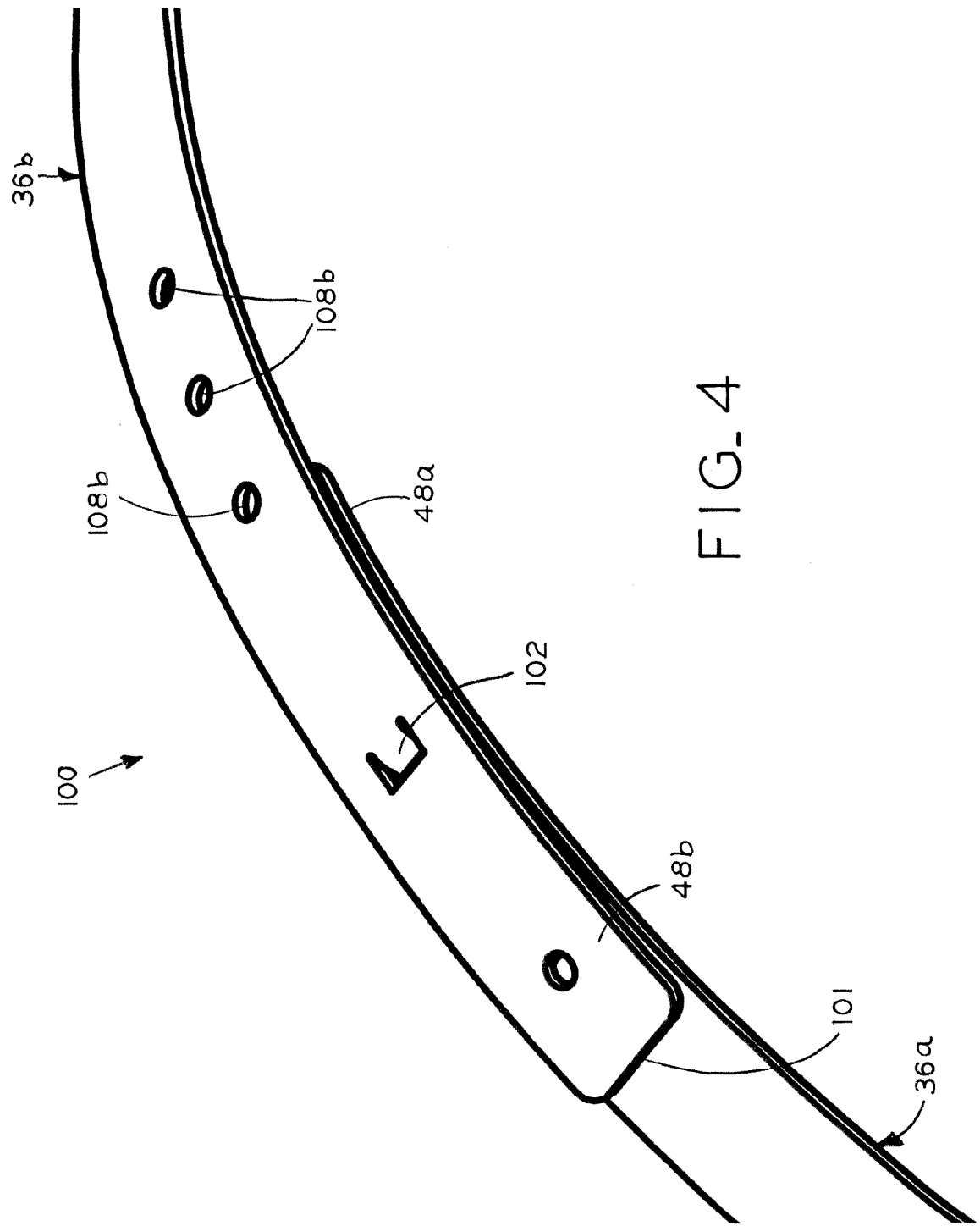
FIG. 4 is a partial perspective view of the expansion ring assembly shown in FIG. 1, illustrating a ratcheting mechanism tooth.

Turning now to FIGS. 3 and 4, ratchet mechanism 100 includes pawl or tooth 102 formed in second ring band 36b and a series or rack 104 of apertures or slots 106 formed in first ring band 36a. In the illustrated embodiment, tooth 102 is integral with second ring band 36b, and may be formed by punching tooth 102 out of the material of band 36b. Tooth 102 is therefore an inwardly extending portion of second ring band 36b, and is directed towards the center of expansion ring assembly 34. Tooth 102 forms angle θ with a tangent plane contacting tooth 102. Angle θ is sufficiently small to allow rack 104 to slide freely in an expanding direction, while being prevented from moving in a contracting direction, as discussed in detail below.

As best seen in FIG. 3, rack 104 includes a plurality of apertures 106 sized to receive tooth 102 therein. Apertures 106 are successively arranged along one of ends 48a of first ring band 36a with spacing or pitch P between respective pairs of apertures 106. Pitch P determines the resolution of adjustment of expansion ring assembly 34 using rack 100. That is to say, as expansion ring assembly 34 is incrementally expanded by advancing tooth 102 from any of apertures 106 to the next neighboring aperture 106 in the direction of end 48a of first ring band 36a, the overall increase in the circumference of expansion ring assembly 34 will be equal to pitch P. Similarly, if the circumference of expansion ring assembly 34 is constrained from expanding by an amount equaling at least pitch P (such as by contact with wall 22 via gasket 26, as discussed above), tooth 102 will not be able to advance to the next neighboring aperture 106 of rack 104. As described in detail herein, drive mechanism may then be used for final non-incremental expansion of expansion ring assembly 34. Thus, ratchet mechanism 100 provides a large-scale or macro adjustment in that expansion ring assembly 34 may only be adjusted using rack 104 by increments of pitch P. On the other hand, drive mechanism 38 (FIGS. 1, 9 and 10) may be used to continuously adjust the size of expansion ring assembly 34 by any amount, to allow precise control over the pressure exerted by expansion ring assembly 34 upon a gasket.

Referring now to FIGS. 3 and 4, end 48b of expansion ring band 36b substantially overlaps end 48a of expansion ring band 36a at ratcheting mechanism 100. This overlap is the result of expansion ring band 36b extending past tooth 102 by a substantial amount, as seen in FIG. 4. Moreover, expansion ring band 36b extends past tooth 102 sufficiently far to ensure overlap between expansion ring bands 36a, 36b at ratcheting mechanism 100 even when tooth 102 is engaged with the aperture 106 closest to end 48a of expansion ring band 36a. Advantageously, this overlap produces a substantially continuous annular surface at the outside of expansion ring assembly 34, which facilitates proper and continuous sealing pressure against an adjacent structure such as gasket 26. This continuous pressure ensures a fluid-tight seal across the entire extent of ratcheting mechanism 100, and throughout the entire range of motion of same, as described in detail below.

As best seen in FIGS. 9 and 10, drive mechanism 38 generally includes a pair of first threaded members, such as a pair of block members 58, and a second threaded member, such as bolt 60, disposed between and threadingly connecting block members 58. Block members 58 each include threaded bore 62 and a pair of shoulders 64 on opposite sides thereof. The bores 62 of a pair of block members 58 of each drive mechanism 38 are oppositely threaded, for reasons discussed below. Block members 58 are removably attached to respective ends 48a, 48b of expansion ring bands 36a, 36b by sliding shoulders 64 within crimped portions 56 of a pair of ends 48a, 48b of expansion ring bands 36a, 36b until front edges 66 thereof abut ledges 68 of block members 58. The foregoing connection configuration between block members 58 and ends 48a, 48b of expansion ring bands 36a, 36b is exemplary, it being understood that many other types of configurations for removably connecting block members 58 to ends 48a, 48b may be devised. For example, it is within the scope of the present disclosure that block members 58 may have an external thread rather than an internal thread, and that bolt 60 may have internal threads adapted to cooperate with the external threads of block members 58. Block members 58 may also be removably attachable to respective ends 48a, 48b of expansion ring bands 36a, 36b by any connection configuration in accordance with the connection configurations between block members and end portions of expansion ring bands described in U.S. Pat. No. 7,146,689, issued Dec. 12, 2006, entitled "Expansion Ring Assembly," the entire disclosure of which is hereby expressly incorporated herein by reference.

Bolt 60 includes oppositely-threaded ends 70a and 70b; for example, end 70a has right-hand threads and end 70b has left-hand threads, or vice-versa. Bolt 60 additionally includes a suitable tool-receiving structure between bolt ends 70a and 70b, such as hexagonal nut portion 72 integrally formed with bolt 60. Although nut portion 72 is shown herein as having a hexagonal configuration, i.e., having six sides, other shapes for nut portion are possible, wherein nut portion may have four, five, six, or more sides, for example. Bolt ends 70a and 70b are threadingly engaged within the corresponding threaded bores 62 of block members 58 to connect block members 58 to bolt 60.

Oversleeve 40 is formed of a segmented strip of material, such as stainless steel, other metals, or a plastic. Similar to expansion ring bands 36a, 36b, oversleeve 40 includes base wall 74 and a pair of side walls 76 extending therefrom to define a U-shaped cross-sectional profile complementary to that of expansion ring bands 36a, 36b, as described above. The distance between side walls 76 of oversleeve 40 is slightly wider than the corresponding distance between side walls 54 of expansion ring bands 36a, 36b, such that ends of 48a, 48b thereof may nest within oversleeve 40 between side walls 76 of oversleeve 40, as shown in FIG. 10.

3. Operation of the Expansion Band

As a first step, expansion band assembly 34 is placed at the site of installation, such as adjacent gasket 26 at wall 22, or adjacent gasket 35 at the junction between two pipes 32a, 32b, for example, as described above. Expansion band assembly 34 is in a contracted or partially contracted state upon being so placed, so that expansion band assembly 34 may be easily maneuvered into a proper position and orientation. Once in the proper position, ratcheting mechanism 100 may be actuated by simply pulling expansion rings bands 36a, 36b apart from one another by hand, thereby drawing tooth 102 over one or more apertures 106 of rack 104. With the initial expansion complete, ratcheting mechanism may optionally be expanded further using ratchet tool 110.

Figure 5:
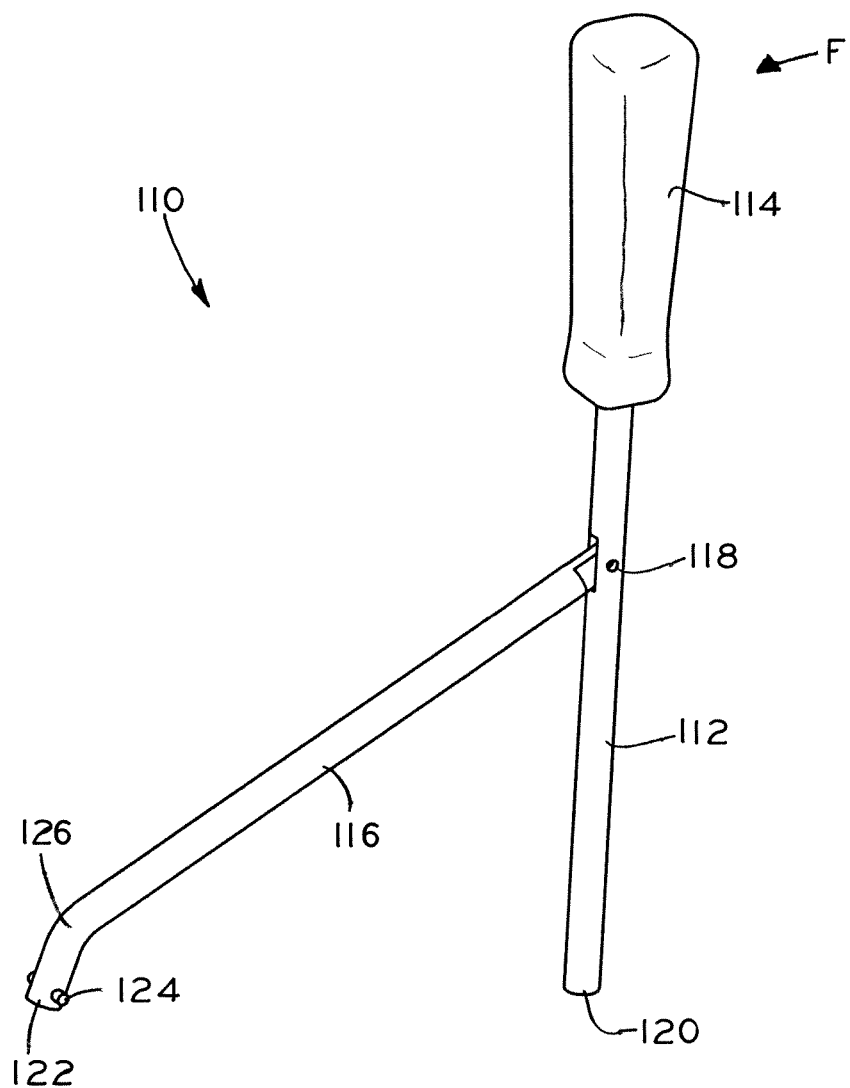
FIG. 5 is a perspective view of an expansion ring ratcheting tool usable with the ratcheting mechanism shown in FIGS. 3 and 4.

Turning now to FIG. 5, ratchet tool 110 may be provided to actuate ratchet mechanism 100. Ratchet tool 110 includes first engagement shaft 112 which is rigidly connected to handle 114. Second engagement shaft 116 is pivotally connected to first engagement shaft 112 at pivot 118. First engagement shaft 112 includes a generally cylindrical engagement end 120 sized to be received within a tool engagement structure such as tool aperture or hole 108a formed in first ring band 36a (FIGS. 2 and 3). Alternatively, engagement end 120 of shaft 112 may be shaped to fit within one of apertures 106, obviating the need for aperture 108a or allowing aperture 108a to be formed as one of apertures 106 in rack 104. Second engagement shaft 116 includes second engagement end 122 sized to be received within another tool engagement structure such as any of a plurality of tool apertures 108b formed in second ring band 36b (FIGS. 1, 2 and 4). Referring to FIG. 3, tool aperture 108a is spaced from and separate from apertures 106. Second engagement end 122 may include transverse pin 124 to control the depth of engagement of second engagement end 122 within tool apertures 108b. Second engagement shaft 116 further includes bend 126 to orient second engagement end 122 to face tool apertures 108b.

In use, ratchet tool 110 may be used to provide an expanding force to expansion ring assembly 34 at ratchet mechanism 100. First engagement end 120 of first shaft 112 is engaged with tool aperture 108a of first ring band 36a. One of tool apertures 108b is selected for engagement with second engagement end 122 of second shaft 116, depending on the relative position of tooth 102 with respect to rack 104. Once first and second engagement ends 120, 122 are engaged with tool apertures 108a, 108b, force F is applied to handle 114 in the direction of second shaft 116. Force F urges the expansion of expansion ring assembly 104 by forcing apertures 108a, 108b apart. Second shaft 116 pivots with respect to first shaft 112 about pivot 118, allowing first and second engagement ends 120, 122 to move apart from one another as expansion ring assembly 34 expands. Advantageously, ratchet tool 110 allows the use of ratchet mechanism 100 to incrementally expand expansion ring assembly 34 against gasket 26, thereby aiding in the formation of a fluid tight seal and minimizing any further adjustment needed with drive mechanism 38. Once ratchet mechanism 100 has been fully expanded using ratchet tool 110, drive mechanism 38 may be used for final adjustment in the expansion or contraction of expansion ring assembly 34 to achieve a precise pressure upon a gasket, as described in detail below.

To actuate drive mechanism 38, a suitable tool, such as an open-end wrench or a torque wrench, for example, is engaged with nut portion 72 of bolt 60 and used to rotate bolt 60 in a first direction as illustrated by arrow 78 (shown in FIG. 10). Upon rotation of bolt 60, the threaded engagement between bolt ends 70a and 70b and threaded bores 62 of block members 58 drives block members 58 simultaneously away from one another along bolt 60, thereby forcing a pair of ends 48a, 48b of expansion ring bands 36a, 36b apart from one another to non-incrementally expand the diameter of expansion ring assembly 34. During such expansion, oversleeve 40 prevents relative lateral movement between ends 48a, 48b of expansion ring bands 36a, 36b at drive mechanism 38, such that ends 48a, 48b are constrained to move apart from one another only along the direction indicated by arrow 80.

Referring generally to FIGS. 1-3 and 10, gasket 26 is shown disposed within opening 24 in wall 22, and expansion ring assembly 34 is shown fitted within the interior of gasket 26. At one side of expansion ring assembly 34, ratchet mechanism 100 is provided to allow a rapid, large-scale adjustment of the circumference of expansion ring assembly by allowing apertures 106 of rack 104 to slide freely over tooth 102 as expansion rings bands 36a, 36b are moved relative to one another in an expanding motion. At another side of expansion ring assembly 34, block members 58 of drive mechanism 38 are received within a pair of respective ends 48a, 48b of expansion ring bands 36a, 36b, and this pair of ends 48a, 48b are nested within oversleeve 40, which overlaps ends 48a, 48b and spans the gap therebetween which is bridged by drive mechanism 38. Drive mechanism 38 is oriented such that bolt 60 is disposed perpendicular to longitudinal axis $L_1$-$L_1$ (FIGS. 6 and 10) which axis is common to expansion ring assembly 34, gasket 26, and opening 24.

The expansion of expansion ring assembly 34 compresses gasket 26 between expansion ring bands 36a, 36b and opening 24 in wall 22 to provide a fluid tight seal between gasket 26 and wall 22. Bolt 60 may also be rotated in a second direction opposite the first direction along arrow 78 if needed, which simultaneously drives block members 58 toward one another along bolt 60, thereby allowing expansion ring assembly 34 to contract. In this manner, expansion ring assembly 34 may be removed after installation if necessary, in order to reposition expansion ring assembly 34 or alternatively, to re-use expansion ring assembly 34 in another installation or application. For example, ring assembly 34 can be repositioned proximate another gasket and then ratcheting mechanism 100 and drive mechanism 38 can be actuated in the manner described above to expand ring assembly 34 such that ring assembly 34 cooperates with the other gasket to form a fluid tight seal.

Advantageously, the threaded engagement between the oppositely-threaded ends 70a and 70b of bolt 60 and block members 58 simultaneously drives block members 58 apart from one another along bolt 60 such that only a single tool need be used to actuate drive mechanism 38. A single turn of a wrench, for example, drives both block members 58 apart from one another simultaneously, such that block members 58 need not be separately adjusted. Thus, the simultaneous use of multiple wrenches, as well as multiple manual adjustment steps, is avoided. Additionally, the threaded engagement between bolt ends 70a and 70b and block members 58 allows an infinitely variable degree of adjustment of drive mechanism 38, such that expansion ring assembly 34 may be selectively expanded to any desired extent. In this manner, expansion ring assembly 34 can accommodate gaskets 26 of varying nominal sizes, and further, can also accommodate irregularities or size variations between gaskets 26 of the same nominal size.

Also advantageously, the combination of ratcheting mechanism 100 with drive mechanism 38 in a single expansion ring assembly 34 facilitates a rapid and precise installation by a single installer. Ratcheting mechanism may be used for large-scale adjustments, and may be placed within an opening to be sealed by a single person by manually expanding the band to roughly fit the required aperture size. With the installer's hands freed and the gasket (i.e., gasket 26 or 35, for example) held in place, the installer can use ratchet tool 110 to further expand expansion ring assembly 34, and finally, can use another tool to actuate drive mechanism 38 for fine adjustments, to quickly create a final and precise seal. In the exemplary embodiment shown in the figures, the final adjustment may be used to impart a specific, precise and known pressure upon a gasket by applying a specific, known torque to bolt 60 of drive mechanism 38. Because the pressure exerted by expansion ring assembly directly correlates to the torque applied to bolt 60, the pressure exerted upon the gasket may be inferred by the torque applied. In this way, drive mechanism 38 allows a highly precise adjustment in conjunction with the rapid expansion afforded by ratcheting mechanism 100.

Yet another advantage of expansion ring assembly 34 is that, in the collapsed state, expansion ring assembly may be made small enough to fit easily within an installation space such as a manhole or pipe assembly. For example, the substantial overlap of expansion ring bands 36a, 36b allows expansion ring assembly 34 to be collapsed to a substantially smaller overall circumference as compared with the fully expanded circumference of expansion ring assembly 34. Still further, this overlap cooperates with oversleeve 40 to ensure that, even when expansion ring assembly 34 is in a fully expanded condition, the outer or sealing surface of expansion ring assembly 34 defines a continuous annular surface that evenly distributes the sealing pressure against a gasket (such as, for example, gaskets 26 or 35). As best seen in FIG. 4, step 101 presents only a minimal interruption in the continuity of the outer surface, with such disruption easily absorbed by a typical gasket.

While this invention has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains and which falls within the limits of the appended claims.

What is claimed is:

1. An expansion ring assembly for sealing a gasket against an annular surface, the expansion ring assembly comprising:
a ring having a circumference, said ring including first and second ring bands each having opposite ends;
a ratcheting mechanism joining respective first ends of said ring bands, said ratcheting mechanism allowing incremental expansion of said circumference of said ring by a first distance and preventing contraction of said circumference of said ring; and
a drive mechanism joining respective second ends of said ring bands, said drive mechanism including:
  a pair of first threaded members joined to said respective second ends of said ring bands; and
  a second threaded member disposed between and threadingly connecting said pair of first threaded members, said drive mechanism allowing non-incremental expansion of said circumference of said ring by a second distance to a fully expanded configuration, said drive mechanism also allowing non-incremental contraction of said circumference of said ring by a third distance, whereby said expansion ring assembly cooperates with the gasket to form a fluid tight seal at the annular surface in the fully expanded configuration.

2. The expansion ring assembly of claim 1, wherein said first distance is greater than said second distance.

3. The expansion ring assembly of claim 1, wherein said ring bands cooperate to form a generally circular profile.

4. The expansion ring assembly of claim 1, wherein one of said first ends of said ring bands overlaps the other first end of said ring bands, whereby said overlap produces a substantially continuous surface at an outside portion of the expansion ring assembly to facilitate a continuous sealing pressure against the gasket.

5. The expansion ring assembly of claim 1, said ratcheting mechanism comprising:
a tooth formed on said second ring band; and
a plurality of apertures formed in said first ring band, each of said apertures sized to receive said tooth therein, whereby said tooth is advanceable from a position within a first aperture to a position within an adjacent second aperture to incrementally expand said circumference of said ring.

6. The expansion ring assembly of claim 5, the expansion ring assembly further comprising tool engagement structures formed on each of said first ring band and said second ring band.

7. The expansion ring assembly of claim 6, wherein said tool engagement structures on said first ring band are formed as holes, said holes spaced from and separate from said plurality of apertures formed in said first ring band.

8. The expansion ring assembly of claim 1, wherein said pair of first threaded members are removably attachable to said respective second ends of said ring bands.

9. The expansion ring assembly of claim 1, wherein:
said second threaded member is a bolt, said bolt includes a first threaded portion and a second, oppositely threaded portion;
said pair of first threaded members are respectively a first block member and a second block member, said first block member and said second block member removably attachable to said respective second ends of said rings bands; and
said first block member is threadingly engaged with said first threaded portion of said bolt, and said second block member is threadingly engaged with said second threaded portion of said bolt, whereby rotation of said bolt in a first rotational direction simultaneously drives said first block member and said second block member away from one another along said bolt to non-incrementally expand said circumference of said ring, and rotation of said bolt in a second rotational direction opposite said first rotational direction simultaneously drives said first block member and said second block member toward one another along said bolt to non-incrementally contract said circumference of said ring.

10. The expansion ring assembly of claim 9, wherein said bolt can be rotated in said first rotational direction by applying a known torque to said bolt, said known torque providing a known pressure of the expansion ring assembly against the gasket.

11. The expansion ring assembly of claim 9, wherein said bolt further comprises a tool receiving structure located between said first threaded portion and said second threaded portion.

12. The expansion ring assembly of claim 9, said expansion ring assembly further comprising:
a sleeve secured to said respective seconds ends of said ring bands, whereby said sleeve prevents lateral movement between said ring bands.

13. An expansion ring assembly for sealing a gasket against an annular surface, the expansion ring assembly comprising:
a ring having a circumference, said ring including first and second ring bands each having opposite ends;
means for providing incremental expansion of said circumference of said ring by a first distance, said means for providing incremental expansion preventing contraction of said circumference of said ring; and
means for providing non-incremental expansion of said circumference of said ring by a second distance to a fully expanded configuration, said means for providing non-incremental expansion also allowing non-incremental contraction of said circumference of said ring by a third distance, whereby said expansion ring assembly cooperates with the gasket to form a fluid tight seal at the annular surface in the fully expanded configuration.

14. The expansion ring assembly of claim 13, wherein said first distance is greater than said second distance.

15. The expansion ring assembly of claim 13, wherein said ring bands cooperate to form a generally circular profile.

16. The expansion ring assembly of claim 13, wherein one of said first ends of said ring bands overlaps the other first end of said ring bands, whereby said overlap produces a substantially continuous surface at an outside portion of the expansion ring assembly to facilitate a continuous sealing pressure against the gasket.

* * * * *